Jan. 31, 1950   A. E. DENNIS   2,495,703
MEANS FOR VISUAL INSPECTION BY COMPARISON WITH
A SERIES OF THREE-DIMENSIONAL PICTURES
Filed Sept. 7, 1945

INVENTOR.
Albert E. Dennis
BY
William F. Desmond
ATTORNEY

UNITED STATES PATENT OFFICE 2,495,703

MEANS FOR VISUAL INSPECTION BY COMPARISON WITH A SERIES OF THREE-DIMENSIONAL PICTURES

Albert E. Dennis, United States Army, Philadelphia, Pa.

Application September 7, 1945, Serial No. 615,059

5 Claims. (Cl. 88—14)

(Granted under the act of March 3, 1883, as amended April 30, 1928; 370 O. G. 757)

The invention described herein, if patented may be manufactured and used by or for the Government for governmental purposes, without the payment to me of any royalty thereon.

My invention relates to means for expediting and facilitating the inspection of materials or objects for compliance with predetermined standards or to separate the same into categories based on appearance which is effected by using three-dimensional color photographs produced by utilizing the characteristics of polarized light in lieu of actual samples of the material or object being inspected or graded.

Various methods of sampling, testing and inspecting goods of all kinds have been devised to determine compliance with conditions of contracts of purchase or for other purposes such as the separation of goods of the same class into different groups based on differences in appearance characteristics. In making an inspection for compliance with such conditions, samples of perfect specimens have at times been used to aid the inspector in determining whether or not the goods in question conform to these specimens, and although greater accuracy and uniformity are secured in the ordinary case when samples are used, yet samples of a good many types of materials lose much of their value after relatively short periods of use because they become worn or soiled and can no longer be relied on as accurate guides. Furthermore, actual samples are often bulky and inconvenient to use in actual practice, and if lost or destroyed may be difficult to replace or reproduce.

To overcome these difficulties in carrying out inspections and comparisons of all kinds, I have devised an inspector's chart in which three-dimensional photographs of perfect specimens produced by utilizing the characteristics of polarized light are used in place of actual samples and are viewed through polarizing analyzers or glasses to bring out the visual characteristics of the material or article being tested or inspected, particularly the depth characteristics.

Accordingly, it is an object of the invention to provide new and improved means for inspecting materials and objects of all kinds to determine compliance with appearance characteristics or standards, or for separating them into different categories based on differences in appearance.

A further object of the invention is the provision of new and improved means for making inspections or for separating materials and objects into categories based on appearance characteristics in which sets of standards or samples in the form of three-dimensional photographs of specimens produced by utilizing the characteristics of polarized light are used as substitutes for an actual sample of the material or object being tested or inspected in making inspections, tests or comparisons.

A still further object of the invention is the provision of new and improved means for making inspections or comparisons with respect to appearance characteristics in which three-dimensional photographs of actual specimens produced by utilizing the characteristics of polarized light are used in lieu of actual samples as a guide in making tests or inspections to determine compliance with established standards, so that the samples or standards do not suffer changes in appearance due to wear or soiling incident to use even after they have been used repeatedly.

Another object of the invention is the provision of a new and improved set of standards or samples to be used as a guide in making tests or inspections to determine compliance with established standards which may be readily and inexpensively compiled, are durable in use and may be used repeatedly and, if desired, may be duplicated exactly and as frequently as necessary.

These and other objects of the invention will become apparent from the following description and accompanying drawing in which—

Figure 1 is a schematic diagram illustrating a method for carrying out an inspection of a material such as a fabric using a three-dimensional photograph of a specimen of the material as a sample for the purpose of comparison in lieu of an actual sample of the material.

Figure 2:
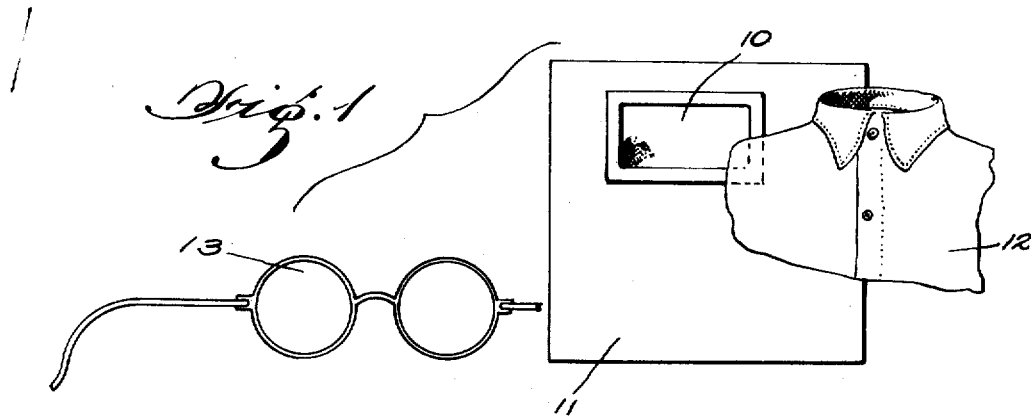
Figure 2 is a schematic view of an arrangement of three-dimensional photographs adaptable for use in lieu of actual samples of the material being inspected for determining appearance characteristics, particularly those in which depth is a factor.

Referring to the drawing, I have diagrammatically shown the method used in making an inspection of a textile material such as the woolen goods used in making Army uniforms for winter wear. To be acceptable, such textiles must pass an inspection in which a number of characteristics such as its color, weight, texture, weave, etc. are examined. Many defects in addition to poor color can be observed upon such a visual inspection, particularly when the inspector has samples of specimens of acceptable and non-acceptable quality for use in making a comparison with the material being inspected. Among the defects thus observable are such things as small breaks in the surface or pick threads, excessively loose or open texture and excessive surface nap. The extent to which such defects may be present in a textile before they constitute grounds for rejecting the same can best be determined by comparing the material being inspected with acceptable grades of the same type of material having varying degrees of defects along with a perfect sample and a sample of the material so defective as to be clearly non-acceptable. After comparison with these samples, it is relatively easy to place the material being inspected in its proper category. However, a difficulty arises in the use of actual samples of material because they soon become worn and soiled and thus in the hands of different inspectors lose their uniformity as standards because the wear and soiling will not be the same in each sample.

My invention is aimed at overcoming these disadvantages in the use of actual samples. Heretofore, the Polaroid Corporation developed and patented the method, mechanism and materials used in producing three-dimensional photographs in color utilizing polarized light along with analyzers or glasses to be used in viewing these photographs. I have found that photographs made in accordance with these teachings may be used to advantage in place of actual samples in making up sets of standards or samples for use by inspectors, but a certain method must be followed in their use if accurate results are to be obtained with them. Although a single photograph of this type of the object being inspected is sufficient where it is sought only to convey an impression of the appearance of an object, for example, the appearance or cut of the collar of a shirt, better results can be obtained by inspectors if a larger number of photographs of specimens of the material or object ranging from acceptable to non-acceptable are made up as a guide so that an impression of the range of defectiveness or deviation from perfection which may exist before a material or object is subject to rejection is conveyed. To convey this impression it has been found necessary to include as part of the sample or chart a photograph of a perfect sample and a photograph of a sample defective to a degree sufficient to clearly place it in a group rejectable on that ground. Preferably one or more additional photographs are included on the chart or standard of samples in the range of defectiveness and perfection represented by the first two photographs to aid inspectors in making a determination.

In Figure 1 of the drawing, I have illustrated a method of carrying out the invention where it is desired merely to show the appearance of an object or body including its three-dimensional characteristics. In this figure, a three-dimensional photograph of a perfect specimen of the particular object or body is indicated at 10 mounted on a chart or backing 11. In use this photograph is viewed through analyzers or glasses 13 of the type manufactured by the Polaroid Corporation having lenses which are polarized in planes normal to each other. When viewed through these analyzers the three-dimensional characteristics of the object in the photograph 10 are brought out so that it has the same appearance as the actual object. In this manner, a very accurate impression of the actual appearance of the object is conveyed.

If it is desired to compare the appearance of some part of an object of the type depicted in the photograph with a perfect specimen, this can be done by placing the object 12, for example, a man's shirt, adjacent to photograph 10 of a shirt of this type perfect in construction and viewing both through the analyzers 13. The three-dimensional characteristics of the photograph are brought out, but the appearance of the actual object is not affected by the analyzers so that an accurate comparison between the two can be made at least with respect to depth characteristics. The degree of accuracy and uniformity achieved by this method of comparison far exceeds that obtained when no standard or sample is used, because the inspector's conception of the appearance of the object is not based on description or memory alone, but is based upon a perception of the actual appearance of the object secured by viewing the three-dimensional photograph 10.

However, the single photograph of Figure 1 does not give any conception of the range of appearance characteristics which may occur, or the extent to which a material or object may be defective and yet be acceptable. In Figure 2 I have illustrated an inspector's chart or sample in which in addition to a photograph 14 of a perfect specimen a second photograph 15 is included, depicting a specimen of the same material or object as shown in photograph 14, but having defects of a degree sufficient to place the material or object in a class failing to comply with minimum standards of acceptability. When two photographs of the type described are included on a single chart and viewed through analyzers 13, an impression is conveyed thereby of the range of appearance characteristics which may occur in the given material or object, but the part of the range within which materials may fall and still be acceptable is not indicated.

Figure 3:
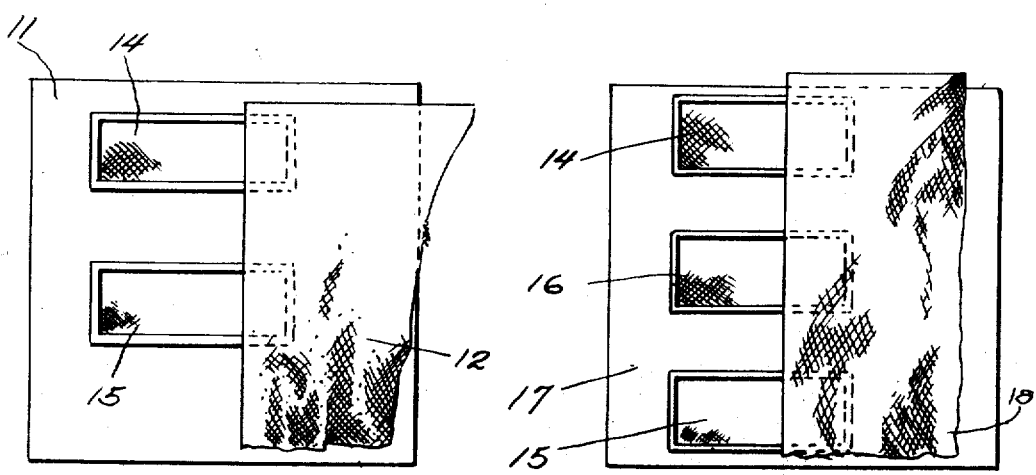
Figure 3 is a schematic view similar to Figure 2 but showing three-dimensional photographs arranged together to depict appearance characteristics ranging from satisfactory to non-satisfactory.

A means for clearly defining this latter range in appearance is shown in Figure 3 wherein in addition to the two photographs 14 and 15 shown in Figure 2, a third photograph 16 is included on a chart or backing 17. This is a photograph of a sample of material having defects in appearance of a degree sufficient to place it on the border line of acceptability. Thus, any sample of material not equalling the photograph 16 in appearance when viewed through analyzers 13 is reject able and any sample in the range of appearance between the photograph 14 of a perfect specimen and the photograph 16 of a border line specimen is clearly acceptable.

In order to facilitate the use of these sample or standards in making an inspection the three photographs 14, 15 and 16 are mounted side b side on a single backing sheet such as the cha 17 as shown in Figure 3 with the proper legen to identify each of them. If this is a chart f use in inspecting a textile, then the textile can be partly overlaid on the photographs whi they are being viewed through the polarizi analyzers 13.

The important consideration in making charts for the guidance of inspectors is that th contain photographs of more than one specim of the particular type of material being inspect so that together they show varying degrees defectiveness and also the limit of defectiven beyond which a material is subject to rejecti so that the inspector has an accurate and fl ible guide. Since any number of prints desired can be made from a single negative, it will be obvious that any number of inspector's charts may be made up and all of these charts will be uniform and will remain so, even after extended use, so that all inspectors are aided in their work by uniform guides with the result that a greater degree of uniformity in inspections can be achieved as between different inspectors.

While the invention has been described as applied to the inspection of textile materials, it will be obvious that the same principles may be advantageously applied wherever materials or objects are to be divided into different categories based on differences in appearance characteristics. Three-dimensional photographs made and compiled in accordance with the teachings of this invention may be used in lieu of actual samples so that the photograph itself becomes the sample in all procedures where it becomes necessary to demonstrate workmanship, physical appearance and other variable characteristics which cannot be definitely described by words or clearly shown in the ordinary photograph. In other words, these photographs are useful wherever samples have previously been used to show appearance characteristics and they may be used in lieu of actual samples by salesmen, inspectors, or others who commonly use samples in the conduct of their business.

While a preferred embodiment of the invention has been shown and described, it is to be understood that modifications may be made therein and that protection is sought for all such modifications coming within the scope of the appended claims.

I claim:

1. An inspector's chart for side by side visual comparison with the surface of a three-dimensional object, said chart comprising a plurality of three-dimensional photographs of specimens corresponding to such three-dimensional object, said three-dimensional photographs being mounted on a backing in assembled relation, each of said three-dimensional photographs producing a depth image when viewed through an analyzer, at least one of said three-dimensional photographs being the photograph of an imperfect but acceptable specimen having physical three-dimensional surface characteristics placing it not below the borderline of a predetermined standard of acceptability, and at least one other of said three-dimensional photographs being the photograph of an imperfect and unacceptable specimen having physical three-dimensional surface characteristics placing it below the borderline of said predetermined standard of acceptability; whereby the acceptability of such object in accordance with its visually observable three-dimensional surface characteristics may be determined.

2. An inspector's chart for side by side visual comparison with the surface of a three-dimensional object, said chart comprising a plurality of three-dimensional photographs of specimens corresponding to such three-dimensional object, said three-dimensional photographs being mounted on a backing in assembled relation, each of said three-dimensional photographs producing a depth image when viewed through an analyzer, one of said three-dimensional photographs being the photograph of an imperfect but acceptable specimen having physical three-dimensional surface characteristics placing it on the borderline of a predetermined standard of acceptability, and at least one other of said three-dimensional photographs being the photograph of an imperfect and unacceptable specimen having physical three-dimensional surface characteristics placing it below the borderline of said predetermined standard of acceptability; whereby the acceptability of such object in accordance with its visually observable three-dimensional surface characteristics may be determined.

3. An inspector's chart for side by side visual comparison with the surface of a three-dimensional object, said chart comprising a plurality of three-dimensional photographs of specimens corresponding to such three-dimensional object, said three-dimensional photographs being mounted on a backing in assembled relation, each of said three-dimensional photographs producing a depth image when viewed through an analyzer, one of said three-dimensional photographs being the photograph of a specimen having substantially perfect physical three-dimensional surface characteristics, at least one other of said three-dimensional photographs being the photograph of an imperfect but acceptable specimen having physical three-dimensional surface characteristics placing it on the borderline of a predetermined standard of acceptability, and at least one other of said three-dimensional photographs being the photograph of an imperfect and unacceptable specimen having physical three-dimensional surface characteristics placing it below the borderline of said predetermined standard of acceptability; whereby the acceptability of such object in accordance with its visually observable three-dimensional surface characteristics may be determined.

4. An inspector's chart for side by side visual comparison with the surface of a three-dimensional object, said chart comprising a plurality of three-dimensional light-polarizing photographs of specimens corresponding to such three-dimensional object, said three-dimensional photographs being mounted on a backing in assembled relation, each of said three-dimensional photographs producing a depth image when viewed through an analyzer, at least one of said three-dimensional photographs being the photograph of an imperfect but acceptable specimen having physical three-dimensional surface characteristics placing it not below the borderline of a predetermined standard of acceptability, and at least one other of said three-dimensional photographs being the photograph of an imperfect and unacceptable specimen having physical three-dimensional surface characteristics placing it below the borderline of said predetermined standard of acceptability; whereby the acceptability of such object in accordance with its visually observable three-dimensional surface characteristics may be determined.

5. An inspector's chart for side by side visual comparison with the surface of a three-dimensional object, said chart comprising a plurality of three-dimensional light-polarizing color photographs of specimens corresponding to such three-dimensional object, said three-dimensional photographs being mounted on a backing in assembled relation, each of said three-dimensional photographs prdoucing a depth image when viewed through an analyzer, at least one of said three-dimensional photographs being the photograph of an imperfect but acceptable specimen having physical three-dimensional surface characteristics placing it not below the borderline of a predetermined standard of acceptability, and at least one other of said three-dimensional photographs being the photograph of an imperfect and unacceptable specimen having physical three-dimensional surface characteristics placing it below the borderline of said predetermined standard of acceptability; whereby the acceptability of such object in accordance with its visually observable three-dimensional surface characteristics may be determined.

ALBERT E. DENNIS.

REFERENCES CITED

The following references are of record in the file of this patent:

UNITED STATES PATENTS

| Number | Name | Date |
|---|---|---|
| 703,319 | Tallquist | June 24, 1902 |
| 1,561,751 | Smith | Nov. 17, 1925 |
| 2,203,687 | Land et al. | June 11, 1940 |
| 2,397,272 | Land | Mar. 26, 1946 |

OTHER REFERENCES

Bausch and Lomb Publication E-216; published 1930 (4 pages).